United States Patent [19]

Mockenhaupt

[11] Patent Number: 5,673,920
[45] Date of Patent: Oct. 7, 1997

[54] GASKET BOLT HOLE WITH RETAINING BEAM AND SLOT

[75] Inventor: Martin Mockenhaupt, Highland Park, Ill.

[73] Assignee: Fel-Pro Incorporated, Skokie, Ill.

[21] Appl. No.: 713,137

[22] Filed: Sep. 16, 1996

[51] Int. Cl.⁶ .............................. F16J 15/06; F16B 33/00; F16B 13/04
[52] U.S. Cl. ........................... 277/9.5; 277/9; 277/11; 277/235 B; 411/533
[58] Field of Search ................... 277/9, 9.5, 11, 277/235 B; 411/533

[56] References Cited

U.S. PATENT DOCUMENTS

| | | | |
|---|---|---|---|
| 3,332,141 | 7/1967 | Hopp | 277/9 |
| 4,269,417 | 5/1981 | Dutton | 277/11 |
| 4,300,866 | 11/1981 | Fisher et al. | 411/533 |
| 5,082,412 | 1/1992 | Thomas | 411/533 |
| 5,207,535 | 5/1993 | Saab | 411/533 |
| 5,375,851 | 12/1994 | Mockenhaupt | 277/9 |
| 5,544,902 | 8/1996 | Behter | 277/235 B |

*Primary Examiner*—William A. Cuchlinski, Jr.
*Assistant Examiner*—Christina Annick
*Attorney, Agent, or Firm*—Laff, Whitesel, Conte & Saret, Ltd.

[57] ABSTRACT

A gasket defining a service opening of a bolt hole. The bolt hole has one or more spaced beams which engage and grip a bolt and which resist removal of the bolt. Each beam is spaced inwardly of the outer wall of the bolt hole and will flex along its length without fracturing. The beams may be cantilever beams or may be connected at both ends of the beam to the wall of the bolt hole. The beams are long and narrow and are at least four times as long as they are wide.

19 Claims, 3 Drawing Sheets

GASKET BOLT HOLE WITH RETAINING BEAM AND SLOT

BACKGROUND OF THE INVENTION

To speed and simplify the installation of gaskets and to secure them for assembly with bolts in a wide variety of environments, it has been found to be desirable to provide gripping tabs in the gasket bolt holes. These effectively provide reduced diameter zones in the gasket bolt holes which facilitate the securance of bolts in the bolt holes. These reduced diameter zones will grip a bolt or will engage the threads on a bolt and will hold the gasket in position relative to the bolt and to the part to which the gasket is to be secured. A typical prior art arrangement is illustrated in FIGS. 1 to 3 hereof.

Although such prior art constructions are usually effective for their intended purposes and for use in many environments, a number of plastic materials, such as rigid engineering plastics and glass-filled reinforced engineering plastics tend to fracture when gripping tabs which are typically formed in thin sections, as is usually the case in prior art constructions, are loaded. If they fracture, the gripping tabs then either fail to function as designed, or leave debris in locations in which the debris could adversely affect the assembly which the gasket is designed to seal.

It would therefore be desirable to provide an improved bolt retaining mechanism for use in plastic carriers and gaskets, and particularly for those carriers and gaskets in which the rigidity of the carrier or gasket material defining the bolt holes is such that fracture of conventional tabs is a regular risk.

SUMMARY OF THE INVENTION

In accordance with the present invention a gasket having a gasket body defining at least one service opening and at least one bolt hole having at least one beam located within the perimeter of the bolt hole is provided. Each beam defines an inner surface adapted to engage, grip and resist removal of a bolt positioned in the bolt hole. Each beam is formed integrally with the gasket body and has an outer surface confronting the gasket body and defining a slot therewith substantially along the length of the beam adjacent the outer surface, thereby to form the beam. When a bolt is forced into the bolt hole, each beam in the bolt hole will tend to flex along its length and inner surface without fracturing.

The bolt hole has a back-up section to facilitate gripping by the beam. A second beam may provide the back-up section, and preferably the bolt hole has at least two elongated beams, each beam defining an inner surface. The inner surfaces are spaced from each other. Desirably the beams in the bolt hole are three in number. The inner surface of the beam desirably includes a parti-circular segment to engage and grip a bolt.

In one preferred form, the bolt hole has at least one cantilever beam therein, each cantilever beam being formed integrally with the gasket body at one end of the beam only.

In another form, each of the beams is integral with the gasket body at each of its ends. Preferably the beams are elongated and are at least four times as long as they are wide. Most desirably the beams are at least six times as long as they are wide. In one form of the invention, the beams are two in number and the inner surfaces are generally parallel to each other. In another form, the elongated beams are disposed at acute angles to each other in plan view.

In a most preferred form, the invention comprises a gasket having a gasket body defining at least one service opening and at least one bolt hole having at least one elongated beam located within the perimeter of the bolt hole, and a back-up section in the hole for cooperation with the elongated beam in gripping a bolt positioned in the hole, each beam defining an inner surface adapted to engage, grip and resist removal of a bolt positioned in the bolt hole, each beam being formed integrally with the gasket body and having an outer surface which is oriented in a direction which is generally parallel to the inner surface, the outer surface and the gasket body defining an elongated slot therewith along the length of the beam adjacent the outer surface, thereby to form the beam, and wherein when a bolt is forced into a bolt hole, each beam in the bolt hole will tend to flex along its length and inner surface without fracturing. Preferably the bolt hole has at least two elongated beams, one of the beams serving as the back-up section, each elongated beam defining an inner surface, with the inner surfaces being spaced from each other. In the most preferred form, the bolt hole has at least one cantilever beam therein, each cantilever beam being formed integrally with said gasket body at one end of the beam only, the inner beam surface includes a parti-circular segment to engage and grip a bolt, each beam being elongated and at least four times as long as it is wide, with the elongated beams being disposed at acute angles to each other in plan view.

Further objects, features and advantages of the present invention will become apparent from the following description and drawings.

DETAILED DESCRIPTION

Figure 1:
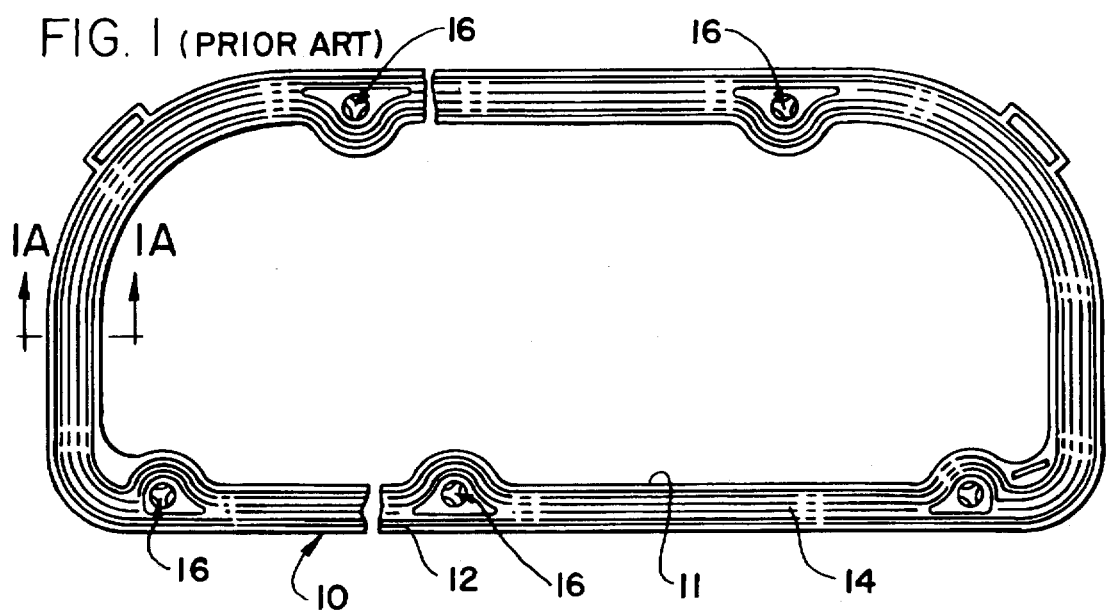
FIG. 1 is a plan view of a typical gasket employing a prior art gripping tab mechanism in the gasket bolt holes.
Figure 1A:
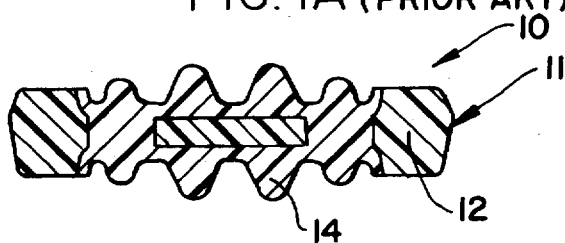
FIG. 1A is a cross-sectional view of the prior art gasket of FIG. 1 taken substantially along line 1A—1A of FIG. 1.
Figure 2:
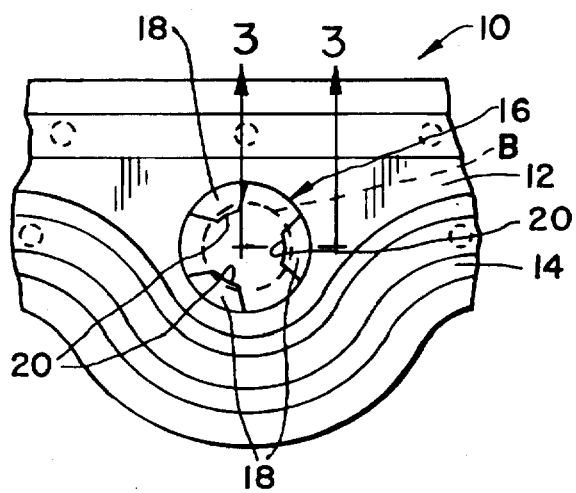
FIG. 2 is an enlarged view of a portion of the prior art gasket of FIG. 1.
Figure 3:
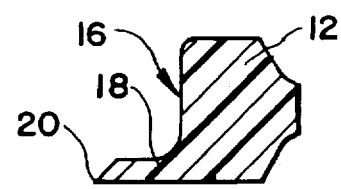
FIG. 3 is a cross-sectional view of the prior art gasket of FIG. 1 taken substantially along line 3—3 of FIG. 2.

Referring first to a typical prior art gasket having a bolt retaining bolt hole employing a typical tab mechanism, FIGS. 1–3 show a gasket 10 defining at least one service opening 11 and comprising a gasket body such as plastic carrier 12, a perimetric seal, such as an elastomeric seal 14, and a series of bolt holes 16. A selected number of the bolt holes 16, in this case all of them, define a plurality of inwardly projecting tabs 18, in this case three tabs 18 in each hole. Tabs 18 are formed integrally with the plastic of the carrier 12 and project radially inwardly from the side wall of the associated hole 16.

The thicknesses of tabs 18 may be considerably less than the thickness of the carrier 12 at their points of connection, as is clearly shown by FIG. 3. The tabs 18 project radially inwardly to their inner edges 20. Edges 20 of the tabs in a hole desirably lie along a circle which is smaller in diameter than the outer diameter of the threads of the bolt B which they are to grip. As such, the tabs 18 in a hole are normally displaced vertically as they are forced onto a bolt, thereby to retain the gasket 10 on the bolt. When a bolt is somewhat oversized, or the diameter defined by the inner edges 20 of the tabs is undersized, or for other reasons, the tabs sometimes deflect excessively and therefore tend to fracture. This may result in the generation of debris which can interfere with the sealing capacity of the gasket, or which can intrude into the assembly and interfere with the operation of the members of the assembly which the gasket seals.

Figure 4:
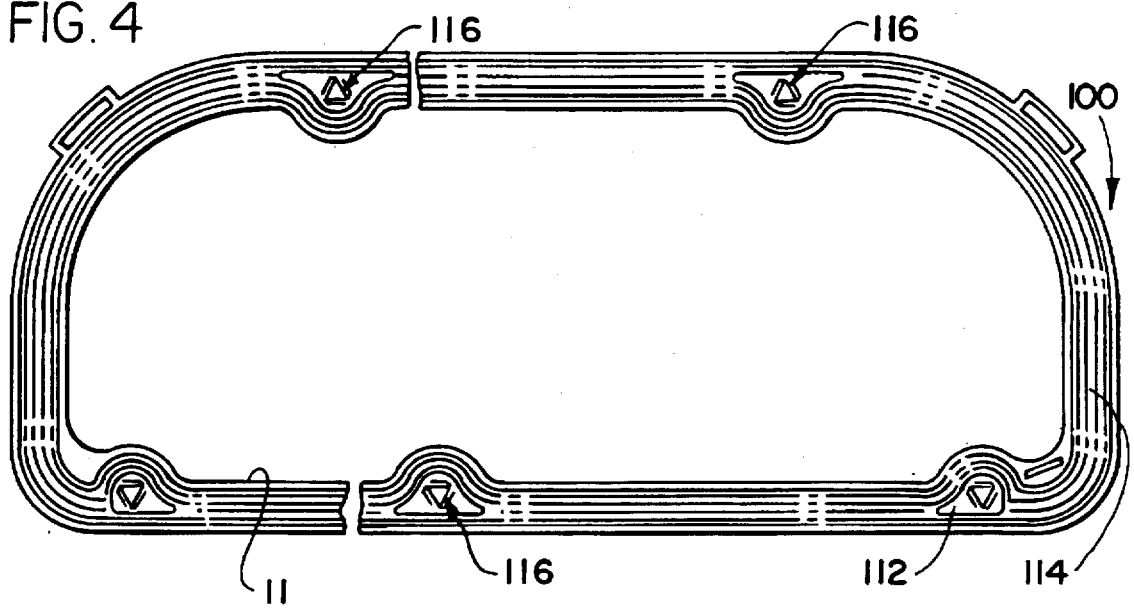
FIG. 4 is a plan view, like FIG. 1, of a gasket employing a bolt retaining beam mechanism in accordance with the present invention.
Figure 5:
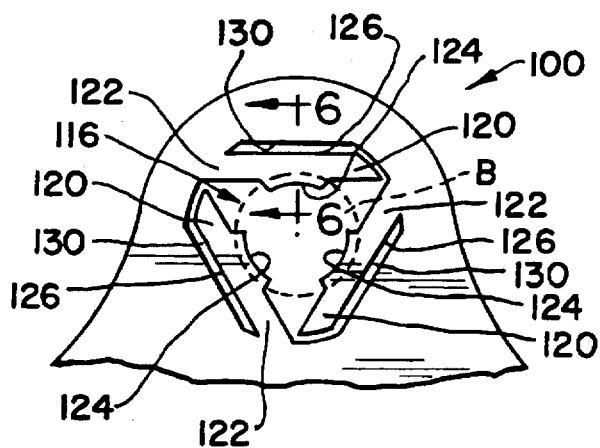
FIG. 5 is an enlarged view of a portion of the gasket of FIG. 4.
Figure 6:
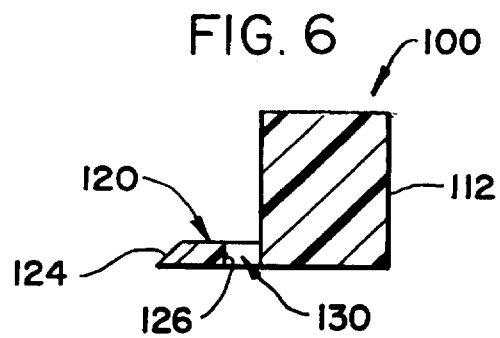
FIG. 6 is a cross-sectional view of the gasket of FIG. 4 taken substantially along line 6—6 of FIG. 5.

Referring now to FIGS. 4–6, it will be seen that the present invention may be applied to a gasket like a prior art gasket 10. To that end, the gasket 100 defines a service opening and comprises a gasket body which may be a plastic carrier 112, a perimetric seal, such as an elastomeric seal 114, and a series of bolt holes 116. Each bolt hole 116 is adapted to receive a bolt B and is configured to grip a bolt 116 sufficiently so that the bolt and gasket will not casually or easily separate. Each bolt hole 116 defines a plurality of elongated bolt retaining beams 120 which are capable of moving and deflecting relative to the gasket 110 and carrier 112 with which they are integrally formed, all without fracturing.

As seen in FIG. 5, carrier bolt hole 116 is formed with and defines three spaced-apart elongated beams 120. Beams 120 are formed integrally with the gasket and are proportioned and designed to cooperate with, and to grip a bolt B. Bolt B has a greater outside diameter than the circle defined by the inner surface portions 124 (which in part are parti-circular) of the beams which are to engage and grip the bolt. Each elongated beam 120 has an outer surface 126 which is generally parallel to the inner surface 124 and which, with the gasket 100, defines an elongated slot 130 along the length of the associated beam 120 which separates the beam 120 along its length from the gasket body.

A typical bolt hole of the type shown in FIGS. 4 and 5 is one in which the outer surfaces of the slots are on the surfaces of an equilateral triangle which is 0.020 inch on each side (between the apices). The beam length along the length of the inner surface 124 is 0.080 inch from the root to the tip. The width of the beams 120 is 0.080 inch as measured between parallel portions of surfaces 124 and 126. The thickness of the gasket body in the hole (FIG. 6) is 0.096 inch and the thickness of the beam is 0.096 inch. It tapers at its free end generally as illustrated in FIG. 6. It will be apparent that as the gasket 100 is forced onto a bolt or a bolt is forced into a bolt hole, the associated beams 120 will deflect relative to the bolt and bolt threads. Because the elongated beams 120 are formed with the carrier 112 only at their ends 122, they may flex along their lengths and at their inner edges 124, and may also be somewhat displaced in a direction radially outwardly of the hole 116 and toward associated slot 130. To the extent that the plastic of the gasket 100 is rigid, and the bolts and bolt holes are at the extremes of their tolerances, the beams 120 will deflect without fracturing, as the prior art tabs are wont to do, thereby preventing the types of damage attributable to such fracturing. The resistance to damage to the beams 120 is dramatically improved, as compared to what is encountered with tab arrangements typified by the prior art of FIGS. 1–3.

In the embodiment of FIGS. 4–6, the elongated beams 120 are three in number. Beams 120 are each integral with the gasket 100 only at one end 122. The elongated beams are free to behave like cantilever beams and to be displaced in a radially outward direction as well. Preferably the beams 120 are at least four times as long as they are wide and most preferably are at least six times as long as they are wide.

Although a variety of materials may be used for the gaskets and carriers of the present invention, one such material is a glass filled nylon. Other plastic and fiber-filled reinforced plastic materials may be used as well. Further, the gasket may be of plastic or other gasket materials, rather than comprising a carrier with a rubber seal or the like secured thereto, or may be of a plastic material or the like with an integrally formed seal, such as a perimetric sealing bead. Holes in such gaskets, in composite gasket materials, as well as steel, hard rubber and other gasket materials may also be provided with the displaceable beam bolt gripping mechanism described and which will allow deflection while minimizing the adverse affects of deflection, will exert the retention force necessary to hold the gasket to the bolt and which, in the case of rigid plastic materials, will also resist and prevent fracture and the problems accompanying fracture.

Figure 7:
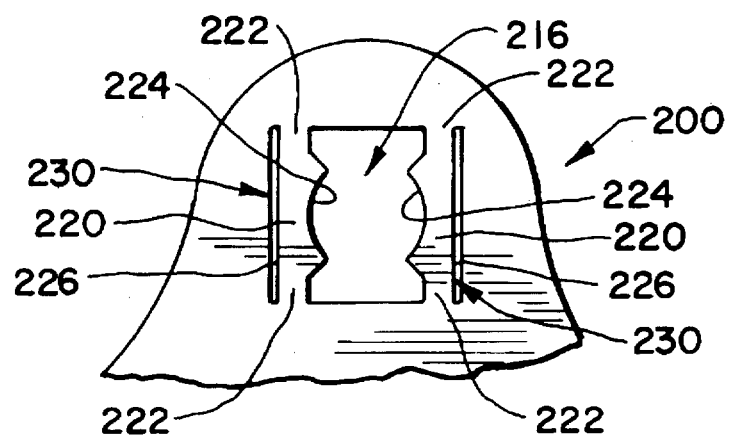
FIG. 7 is a view similar to that of FIG. 5, but of a further embodiment of the present invention.

In the embodiment of FIG. 7, a gasket 200 like the gasket of FIGS. 4–6, defines a service opening (not shown) and a bolt hole 216. Bolt hole 216 is provided with a pair of generally parallel opposed beams 220. Each beam 220 is formed integrally at each beam end 222 with the gasket 200. Beams 220 define confronting inner surface portions 224 which have parti-circular segments, and which are proportioned and designed to grip the surface of a bolt. The outer surface 226 of each beam 220 is generally parallel to the inner surface 224. The outer surface 226 and adjacent gasket body define an elongated slot 230 which extends along the length of the beam. It will be apparent that as a bolt is forced into a bolt hole 216 in the gasket 200, the beams 220 will deflect relative to the bolt threads and the surface portions will tend to move vertically somewhat and, as necessary, will also tend to move in the direction of the slot 230. Like the embodiment of FIGS. 4–6, the lengths of the beams of gasket 200 are at least four times, and preferably at least six times, the width thereof.

Figure 8:
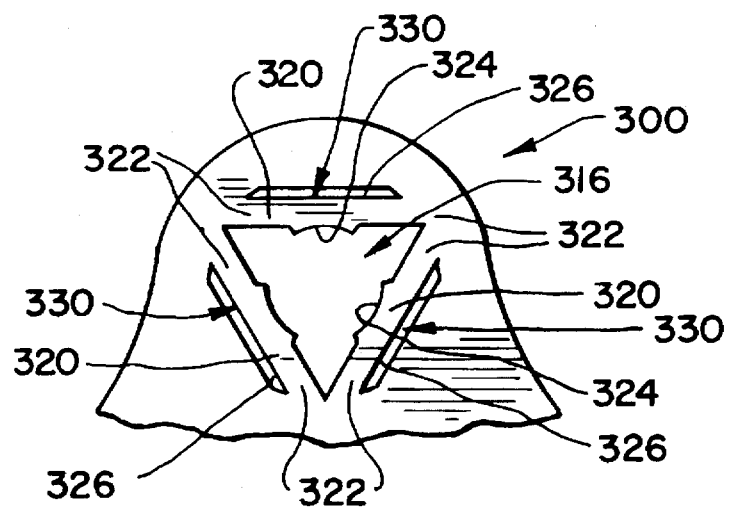
FIG. 8 is a view similar to that of FIG. 5, but of yet another embodiment of the present invention.

In the embodiment of FIG. 8, a gasket 300, which again may otherwise be like the gasket of FIGS. 4–6, defines a service opening and a bolt hole 316. Bolt hole 316 is provided with three opposed beams 320 arrayed in a triangular configuration. Each beam 320 is formed integrally at each beam end 322 with the gasket 300. Beams 320 define confronting inner surface portions 324 which have parti-circular segments, and which are proportioned and designed to grip the surface of a bolt. The outer surface 326 of each beam 320 is generally parallel to the inner surface 324. The outer surface 326 and adjacent gasket body define an elongated slot 330 which extends along the length of the beam. It will be apparent that as a bolt is forced into a bolt hole 316 in the gasket 300, the beams 320 will deflect relative to the bolt threads without fracturing and the surface portions of the beam will move vertically somewhat and, as necessary, will also tend to move in the direction of the slot 330. Like the embodiment of FIGS. 4–6, the lengths of the beams 320 of gasket 300 are at least four times, and preferably at least six times, the width thereof.

Figure 9:
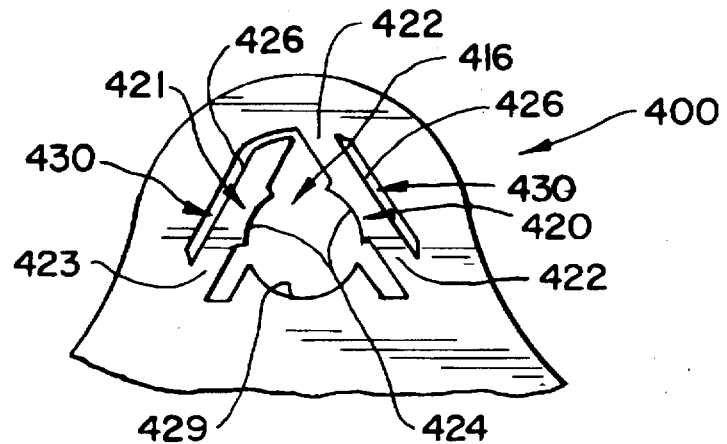
FIG. 9 is a view similar to that of FIG. 5, but of a still further embodiment of the present invention.

In the embodiment of FIG. 9, a gasket 400, which may also like the gasket of FIGS. 4–6, defines a service opening and a bolt hole 416. Bolt hole 416 is provided with a pair of opposed beams 420, 421 which are disposed at an acute angle to each other in plan view. Beam 420 is formed integrally at each end 422 with the gasket, and beam 421 is formed integrally with the gasket at beam end 423. Beams 420, 421 define confronting inner surface portions 424 having parti-circular segments which are proportioned and designed to grip the surface of a bolt 416 in cooperation with the back-up gasket section 429. The outer surfaces 426, 427 of beams 420, 421 are generally parallel to the respective inner surfaces 424. The outer surfaces 426, 427 and adjacent gasket body define elongated slots 430 which extend along the lengths of the beams. It will be apparent that as a bolt is forced into a bolt hole 416 in the gasket 400, the beams 420, 421 will deflect and flex relative to the bolt threads without fracturing, and will move vertically somewhat and, as necessary, will also tend to move in the direction of the slots 430. Back-up gasket section 429, the section of the gasket opposing the beams 420, 421 will maintain the position of the bolt so that the surfaces 424 of the beams 420, 421 will be in gripping engagement therewith. Like the embodiment of FIGS. 4–6, the lengths of the beams 420, 421 of gasket 400 are at least four times, and preferably at least six times, the width thereof.

It will be apparent to those skilled in the art that alternatives to the specific embodiments illustrated and other modifications may be made without departing from the spirit and scope of the invention. Accordingly, it is intended that the invention should not be limited, except as may be necessary in view of the appended claims.

What is claimed is:

1. A gasket having a gasket body defining at least one service opening and at least one bolt hole having at least one beam located within the perimeter of the bolt hole, each said beam defining an inner surface adapted to engage, grip and resist removal of a threaded bolt positioned in said bolt hole, each said beam being formed integrally with said gasket body and having an outer surface opposite said inner surface confronting said gasket body and defining a slot therewith substantially along the length of said beam adjacent said outer surface, said slot extending completely through said gasket body, thereby to form said beam, and wherein when a threaded bolt is forced into a said bolt hole, each said beam in said bolt hole will tend to flex along its length and inner surface without fracturing, thus, engaging and gripping a thread of said threaded bolt to resist removal of said threaded bolt from said bolt hole.

2. A gasket in accordance with claim 1, and wherein said bolt hole has at least two beams, each said beam defining a said inner surface, and wherein said inner surfaces are spaced from each other.

3. A gasket in accordance with claim 2, and wherein said beams in said bolt hole are three in number.

4. A gasket in accordance with claim 2, and wherein at least one of said beams is integral at each end with said gasket body.

5. A gasket in accordance with claim 1, and wherein said bolt hole has at least one cantilever beam therein, each said cantilever beam being formed integrally with said gasket body at one end of said beam only.

6. A gasket in accordance with claim 2, and wherein said bolt hole has at least one cantilever beam, therein, each said cantilever beam being formed integrally with said gasket body at one end of said beam only.

7. A gasket in accordance with claim 1, and wherein said inner surface includes a parti-circular segment to engage and grip a bolt.

8. A gasket in accordance with claim 4, and wherein each of said beams is integral at each of its ends with said gasket body.

9. A gasket in accordance with claim 1, and wherein each said beam is elongated and is at least four times as long as it is wide.

10. A gasket in accordance with claim 1, and wherein each said beam is elongated and is at least six times as long as it is wide.

11. A gasket having a gasket body defining at least one service opening and at least one bolt hole having at least two beams located within the perimeter of the bolt hole, each said beam defining an inner surface adapted to engage, grip and resist removal of a bolt positioned in said bolt hole, wherein said inner surfaces are spaced from each other, and said inner surfaces are generally parallel to each other, each said beam being formed integrally with said gasket body and having an outer surface confronting said gasket body and defining a slot therewith substantially along the length of each said beam adjacent said outer surface, thereby to form each said beam, and wherein when a bolt is forced into a said bolt hole, each said beam in said bolt hole will tend to flex along its length and inner surface without fracturing.

12. A gasket in accordance with claim 2, and wherein said beams are disposed at acute angles to each other in plan view.

13. A gasket in accordance with claim 1, and wherein the said inner surface of a said beam is confronted by a back-up gasket section in said bolt hole to cooperate in gripping a bolt positioned in a said bolt hole.

14. A gasket having a gasket body defining at least one service opening and at least one bolt hole having at least one elongated beam located within the perimeter of the bolt hole, and a back-up section in said hole for cooperation with said elongated beam in gripping a bolt positioned in said bolt hole, each said beam defining an inner surface adapted to engage, grip and resist removal of a threaded bolt positioned in said bolt hole, each said beam being formed integrally with said gasket body and having an outer surface which is oriented in a direction which is generally parallel to and opposite from said inner surface, said outer surface and said gasket body defining an elongated slot therewith along the length of said beam adjacent said outer surface, said slot extending completely through said gasket body, thereby to form said beam, and wherein when a threaded bolt is forced into a said bolt hole, each said beam in said bolt hole will tend to flex along its length and inner surface without fracturing, thus engaging and gripping a thread of said threaded bolt to resist removal of said threaded bolt from said bolt hole.

15. A gasket in accordance with claim 14, and wherein said bolt hole has at least two elongated beams, one of said beams serving as said back-up section, each said elongated beam defining a said inner surface, and wherein said inner surfaces are spaced from each other.

16. A gasket in accordance with claim 14, and wherein said bolt hole has at least one cantilever beam, therein, each said cantilever beam being formed integrally with said gasket body at one end of said beam only.

17. A gasket in accordance with claim 14, and wherein said beam inner surface includes a parti-circular segment to engage and grip a bolt.

18. A gasket in accordance with claim 14, and wherein each said beam is elongated and is at least four times as long as it is wide.

19. A gasket in accordance with claim 15, and wherein said elongated beams are disposed at acute angles to each other in plan view.

* * * * *